(12) United States Patent
Foessel et al.

(10) Patent No.: US 10,721,470 B2
(45) Date of Patent: Jul. 21, 2020

(54) COMPRESSION OF A RAW IMAGE (71) Applicant: Fraunhofer-Gesellschaft zur Foerderung der angewandten Forschung e.V., Munich (DE)

(72) Inventors: Siegfried Foessel, Erlangen (DE); Thomas Richter, Erlangen (DE); Joachim Keinert, Nuremberg (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 101 days.

(21) Appl. No.: 16/029,343

(22) Filed: Jul. 6, 2018

(65) Prior Publication Data

US 2020/0014923 A1    Jan. 9, 2020

(51) Int. Cl.
| | |
|---|---|
| *H04N 19/119* | (2014.01) |
| *H04N 19/182* | (2014.01) |
| *H04N 19/186* | (2014.01) |
| *G06T 3/40* | (2006.01) |

(52) U.S. Cl.
CPC .......... *H04N 19/119* (2014.11); *G06T 3/4015* (2013.01); *H04N 19/182* (2014.11); *H04N 19/186* (2014.11)

(58) Field of Classification Search
CPC .. H04N 19/119; H04N 19/182; H04N 19/186; G06T 3/4015
See application file for complete search history.

(56) References Cited

U.S. PATENT DOCUMENTS

| | | | |
|---|---|---|---|
| 3,971,065 A | 7/1976 | Bayer | |
| 6,134,347 A | 10/2000 | Niwamoto | |

(Continued)

FOREIGN PATENT DOCUMENTS

| | | |
|---|---|---|
| EP | 1575262 A1 | 9/2005 |
| EP | 1657909 A2 | 5/2006 |

OTHER PUBLICATIONS

Dhao, Omar B. et al., "A JPEG-Like Algorithm for Compression of Single- Sensor Camera Image", T/SPIE Electronic Imaging: Digital Photography VII, 2011, United States. 7876, pp. 1-12, 2011, 2011, pp. 1-12.

(Continued)

*Primary Examiner* — Wen W Huang
(74) *Attorney, Agent, or Firm* — Perkins Coie LLP; Michael A. Glenn (57) ABSTRACT

The invention relates to a raw image encoder for encoding a raw image of a predetermined color pattern according to which the raw image is partitioned into pixel cell blocks, each pixel cell block comprising four pixels, each pixel being associated with one of three base colors so that each pixel cell block comprises, for each of the three base colors, at least one pixel, the raw image encoder configured to subject the raw image to a color transformation to obtain a color image, by mapping, for each pixel cell block, the four pixels of the pixel cell block onto a color component quadruple forming a sample of the color image, the color component quadruple comprising three color component values of a target color space, and one pseudo color component value, and subject the color image to a multi-component picture encoding to obtain a compressed data stream.

9 Claims, 3 Drawing Sheets

(56) References Cited

U.S. PATENT DOCUMENTS

| | | | |
|---|---|---|---|
| 2006/0012808 A1* | 1/2006 | Mizukura | H04N 9/045 358/1.9 |
| 2006/0083432 A1* | 4/2006 | Malvar | H04N 1/64 382/232 |
| 2019/0087968 A1* | 3/2019 | Grunnet-Jepsen | G06T 7/593 |

OTHER PUBLICATIONS

Ramanath, Rajeev et al., "Demosaicking methods for Bayer color arrays", Journal of Electronic Imaging 11, 3 (Jul. 2002): 306-315, Jul. 2002, pp. 306-315.

* cited by examiner

COMPRESSION OF A RAW IMAGE

FIELD OF THE INVENTION

The present invention relates to concepts for efficient compression of raw images such as raw images of a Bayer pattern.

BACKGROUND

Image capturing devices as cameras are often based on single or multiple sensor chips. The sensors of the cameras based on a single sensor chip may have multiple photosensitive pixel cells. Said pixel cells may each be provided with color filters having different or similar colors on top of each of the photosensitive pixel cells. The filters enable each pixel cell of the image sensor to capture multiple light spectra or color components for each pixel as a basic image component.

One of the frequently used color filter pattern is a so called "Bayer" pattern, wherein a color filter array is provided for arranging red, green and blue (RGB) color filters on a square grid of photosensitive pixel cells. The Bayer pattern is provided with a set of red, green and blue color filters on top of a four pixel cell block each to create one red, one blue and two green sensitive pixels. The captured values from these pixel cells are called raw data.

Since each pixel is filtered to record one of three colors, the data from each pixel cannot fully specify each of the red, green, and blue values on its own. However for displaying a color image at least 3 color values for each pixel cell position are necessary. To obtain a full color image, an algorithm can be used to interpolate a set of red, green, and blue values for each pixel. These algorithms make use of the surrounding pixels of the corresponding colors to estimate the values for a particular pixel.

For this reason the raw data can be processed to three color components values (typically RGB values) for each pixel cell position. This process is known e.g. as a "demosaicing" process. This can be done by linear interpolation of same colored pixel cells or a more sophisticated method. In this process the raw data will disadvantageously be expanded to an RGB image and the amount of data is increased by a factor of 3.

It is a purpose of the present disclosure to overcome the drawbacks associated with raw images and to allow for an easier handling thereof in order to, for instance, allow for an easier encoding of raw data images.

SUMMARY

An embodiment may have a raw image encoder for encoding a raw image of a predetermined color pattern according to which the raw image is partitioned into pixel cell blocks, each pixel cell block comprising four pixels, each pixel being associated with one of three base colors so that each pixel cell block comprises, for each of the three base colors, at least one pixel, the raw image encoder configured to subject the raw image to a color transformation to obtain a color image, by mapping, for each pixel cell block, the four pixels of the pixel cell block onto a color component quadruple forming a sample of the color image, the color component quadruple comprising three color component values of a target color space, and one pseudo color component value, and subject the color image to a multi-component picture encoding to obtain a compressed data stream.

Another embodiment may have a decoder for reconstructing from a compressed data stream a raw image of a predetermined color pattern according to which the raw image is partitioned into pixel cell blocks, each pixel cell block comprising four pixels, each pixel being associated with one of three base colors so that each pixel cell block comprises, for each of the three base colors, at least one pixel, configured to decode from a compressed data stream by multi-component picture decoding a color image, samples of which are respectively formed by a color component quadruple, and subject the color image to a color transformation to obtain the raw image, by mapping, for each sample of the color image, the color component quadruple to obtain the four pixels of a corresponding pixel cell block, wherein the color component quadruple comprises three color component values of a predetermined color space and pseudo color component value.

Another embodiment may have a raw image encoder for encoding a Bayer pattern raw image, configured to map each pixel cell block of the Bayer pattern raw image which comprises four pixels R (red), $G_1$ (green), $G_2$ (green), and B (blue), onto a color component quadruple {Cr, Cb, Y, DY} according to $$\begin{bmatrix} C_r \\ C_b \\ Y \\ DY \end{bmatrix} = \begin{bmatrix} 3/4 & -1/4 & -1/4 & -1/4 \\ -1/4 & -1/4 & -1/4 & 3/4 \\ 1/4 & 1/4 & 1/4 & 1/4 \\ 0 & 1 & -1 & 0 \end{bmatrix} \cdot \begin{bmatrix} R \\ G_1 \\ G_2 \\ B \end{bmatrix} \text{ or }$$

$$\begin{bmatrix} C_r \\ C_b \\ Y \\ DY \end{bmatrix} = \alpha \cdot \begin{bmatrix} 3/4 & -1/4 & -1/4 & -1/4 \\ -1/4 & -1/4 & -1/4 & 3/4 \\ 1/4 & 1/4 & 1/4 & 1/4 \\ 0 & 1 & -1 & 0 \end{bmatrix} \cdot \begin{bmatrix} R \\ G_1 \\ G_2 \\ B \end{bmatrix}$$

with a being a constant,
which forms a sample of the color image, and subject the color image to a multi-component picture encoding to obtain a compressed data stream.

Another embodiment may have a decoder for reconstructing from a compressed data stream a Bayer pattern raw image, configured to decode from a compressed data stream by multi-component picture decoding a color image, samples of which are respectively formed by a color component quadruple, and map each color component quadruple {Cr, Cb, Y, DY} according to $$\begin{bmatrix} R \\ G_1 \\ G_2 \\ B \end{bmatrix} = \begin{bmatrix} 1 & 0 & 1 & 0 \\ -1/2 & -1/2 & 1 & 1/2 \\ -1/2 & -1/2 & 1 & -1/2 \\ 0 & 1 & 1 & 0 \end{bmatrix} \cdot \begin{bmatrix} C_r \\ C_b \\ Y \\ DY \end{bmatrix} \text{ or }$$

$$\begin{bmatrix} R \\ G_1 \\ G_2 \\ B \end{bmatrix} = b \cdot \begin{bmatrix} 1 & 0 & 1 & 0 \\ -1/2 & -1/2 & 1 & 1/2 \\ -1/2 & -1/2 & 1 & -1/2 \\ 0 & 1 & 1 & 0 \end{bmatrix} \cdot \begin{bmatrix} C_r \\ C_b \\ Y \\ DY \end{bmatrix}$$

with b being a constant,
onto pixels R (red), $G_1$ (green), $G_2$ (green), and B (blue) of a pixel cell block of the Bayer pattern raw image, wherein b may have the value of 1/a.

Another embodiment may have a Decoder for reconstructing from a compressed data stream a Bayer pattern raw image, configured to decode from a compressed data stream by multi-component picture decoding a color image, samples of which are respectively formed by a color component quadruple, and map each color component quadruple {Cr, Cb, Y, DY} according to $$\begin{bmatrix} R \\ G \\ B \end{bmatrix} = \begin{bmatrix} 1 & 0 & 1 & 0 \\ -1/2 & -1/2 & 1 & 0 \\ 0 & 1 & 1 & 0 \end{bmatrix} \cdot \begin{bmatrix} C_r \\ C_b \\ Y \\ DY \end{bmatrix} \text{ or }$$

$$\begin{bmatrix} R \\ G \\ B \end{bmatrix} = b \cdot \begin{bmatrix} 1 & 0 & 1 & 0 \\ -1/2 & -1/2 & 1 & 0 \\ 0 & 1 & 1 & 0 \end{bmatrix} \cdot \begin{bmatrix} C_r \\ C_b \\ Y \\ DY \end{bmatrix}$$

with b being a constant
onto R (red), G (green) and B (blue) components of a sample of an RGB image, wherein b may have the value of 1/a.

According to another embodiment, a method for encoding a Bayer pattern raw image may have the steps of: mapping each pixel cell block of the Bayer pattern raw image which comprises four pixels R (red), $G_1$ (green), $G_2$ (green), and B (blue), onto a color component quadruple {Cr, Cb, Y, DY} according to $$\begin{bmatrix} C_r \\ C_b \\ Y \\ DY \end{bmatrix} = \begin{bmatrix} 3/4 & -1/4 & -1/4 & -1/4 \\ -1/4 & -1/4 & -1/4 & 3/4 \\ 1/4 & 1/4 & 1/4 & 1/4 \\ 0 & 1 & -1 & 0 \end{bmatrix} \cdot \begin{bmatrix} R \\ G_1 \\ G_2 \\ B \end{bmatrix} \text{ or } \begin{bmatrix} C_r \\ C_b \\ Y \\ DY \end{bmatrix} =$$

$$a \cdot \begin{bmatrix} 3/4 & -1/4 & -1/4 & -1/4 \\ -1/4 & -1/4 & -1/4 & 3/4 \\ 1/4 & 1/4 & 1/4 & 1/4 \\ 0 & 1 & -1 & 0 \end{bmatrix} \cdot \begin{bmatrix} R \\ G_1 \\ G_2 \\ B \end{bmatrix}$$

with a being a constant
which forms a sample of the color image, and subjecting the color image to a multi-component picture encoding to obtain a compressed data stream.

According to another embodiment, a method for reconstructing from a compressed data stream a Bayer pattern raw image may have the steps of: decoding from a compressed data stream by multi-component picture decoding a color image, samples of which are respectively formed by a color component quadruple, and mapping each color component quadruple {Cr, Cb, Y, DY} according to $$\begin{bmatrix} R \\ G_1 \\ G_2 \\ B \end{bmatrix} = \begin{bmatrix} 1 & 0 & 1 & 0 \\ -1/2 & -1/2 & 1 & 1/2 \\ -1/2 & -1/2 & 1 & -1/2 \\ 0 & 1 & 1 & 0 \end{bmatrix} \cdot \begin{bmatrix} C_r \\ C_b \\ Y \\ DY \end{bmatrix} \text{ or } \begin{bmatrix} R \\ G_1 \\ G_2 \\ B \end{bmatrix} =$$

$$b \cdot \begin{bmatrix} 1 & 0 & 1 & 0 \\ -1/2 & -1/2 & 1 & 1/2 \\ -1/2 & -1/2 & 1 & -1/2 \\ 0 & 1 & 1 & 0 \end{bmatrix} \cdot \begin{bmatrix} C_r \\ C_b \\ Y \\ DY \end{bmatrix}$$

with b being a constant,
onto pixels R (red), $G_1$ (green), $G_2$ (green), and B (blue) of a pixel cell block of the Bayer pattern raw image, wherein b may have the value of 1/a.

Another embodiment may have a data stream having encoded thereonto a color image generated using a method for encoding a Bayer pattern raw image, the method having the steps of: mapping each pixel cell block of the Bayer pattern raw image which comprises four pixels R (red), $G_1$ (green), $G_2$ (green), and B (blue), onto a color component quadruple {Cr, Cb, Y, DY} according to $$\begin{bmatrix} C_r \\ C_b \\ Y \\ DY \end{bmatrix} = \begin{bmatrix} 3/4 & -1/4 & -1/4 & -1/4 \\ -1/4 & -1/4 & -1/4 & 3/4 \\ 1/4 & 1/4 & 1/4 & 1/4 \\ 0 & 1 & -1 & 0 \end{bmatrix} \cdot \begin{bmatrix} R \\ G_1 \\ G_2 \\ B \end{bmatrix} \text{ or } \begin{bmatrix} C_r \\ C_b \\ Y \\ DY \end{bmatrix} =$$

$$a \cdot \begin{bmatrix} 3/4 & -1/4 & -1/4 & -1/4 \\ -1/4 & -1/4 & -1/4 & 3/4 \\ 1/4 & 1/4 & 1/4 & 1/4 \\ 0 & 1 & -1 & 0 \end{bmatrix} \cdot \begin{bmatrix} R \\ G_1 \\ G_2 \\ B \end{bmatrix}$$

with a being a constant
which forms a sample of the color image, and subjecting the color image to a multi-component picture encoding to obtain a compressed data stream.

Another embodiment may have a non-transitory digital storage medium having a computer program stored thereon to perform the method for reconstructing from a compressed data stream a Bayer pattern raw image, the method having the steps of: decoding from a compressed data stream by multi-component picture decoding a color image, samples of which are respectively formed by a color component quadruple, and mapping each color component quadruple {Cr, Cb, Y, DY} according to $$\begin{bmatrix} R \\ G_1 \\ G_2 \\ B \end{bmatrix} = \begin{bmatrix} 1 & 0 & 1 & 0 \\ -1/2 & -1/2 & 1 & 1/2 \\ -1/2 & -1/2 & 1 & -1/2 \\ 0 & 1 & 1 & 0 \end{bmatrix} \cdot \begin{bmatrix} C_r \\ C_b \\ Y \\ DY \end{bmatrix} \text{ or } \begin{bmatrix} R \\ G_1 \\ G_2 \\ B \end{bmatrix} =$$

$$b \cdot \begin{bmatrix} 1 & 0 & 1 & 0 \\ -1/2 & -1/2 & 1 & 1/2 \\ -1/2 & -1/2 & 1 & -1/2 \\ 0 & 1 & 1 & 0 \end{bmatrix} \cdot \begin{bmatrix} C_r \\ C_b \\ Y \\ DY \end{bmatrix}$$

with b being a constant,
onto pixels R (red), $G_1$ (green), $G_2$ (green), and B (blue) of a pixel cell block of the Bayer pattern raw image, when said computer program is run by a computer, wherein b may have the value of 1/a.

An advantage of concepts of the present application stems from an efficient way of handling the pixel cell blocks of raw images. They are transformed to a color component quadruple forming of a sample of a color image, the quadruple comprising three color values of a target color space and a pseudo color component. This may be done lossless. The color transformation fulfills two tasks concurrently: a decorrelation of the information of the raw data values is achieved—at least for homogenous areas which is the most part of images, thereby reducing the entropy and allowing better compression efficiency. In the case of a mathematically lossless coding the resulting color image, the overall compression results in a lossless transformation of data into a data stream from which either the original raw image may be derived, or an image corresponding to the raw image which shows the content in the target color space, but is of half width and height compared to the raw image, i.e. has half resolution.

BRIEF DESCRIPTION OF THE DRAWINGS

Embodiments of the present invention will be detailed subsequently referring to the appended drawings, in which.

DETAILED DESCRIPTION OF THE INVENTION

The subject matter is now described with reference to the drawings, wherein like reference numerals are used to refer to like elements throughout. In the following description, for purposes of explanation, numerous specific details are set forth in order to provide a thorough understanding of the subject matter. It is understood that subject matter embodiments can be practiced without these specific details.

In particular, the description starts with presenting a specific example, sets out advantages and then provides further embodiments rendering clear that the advantages may also be achieved by slightly deviating from the specific example outlined before.

Figure 1:
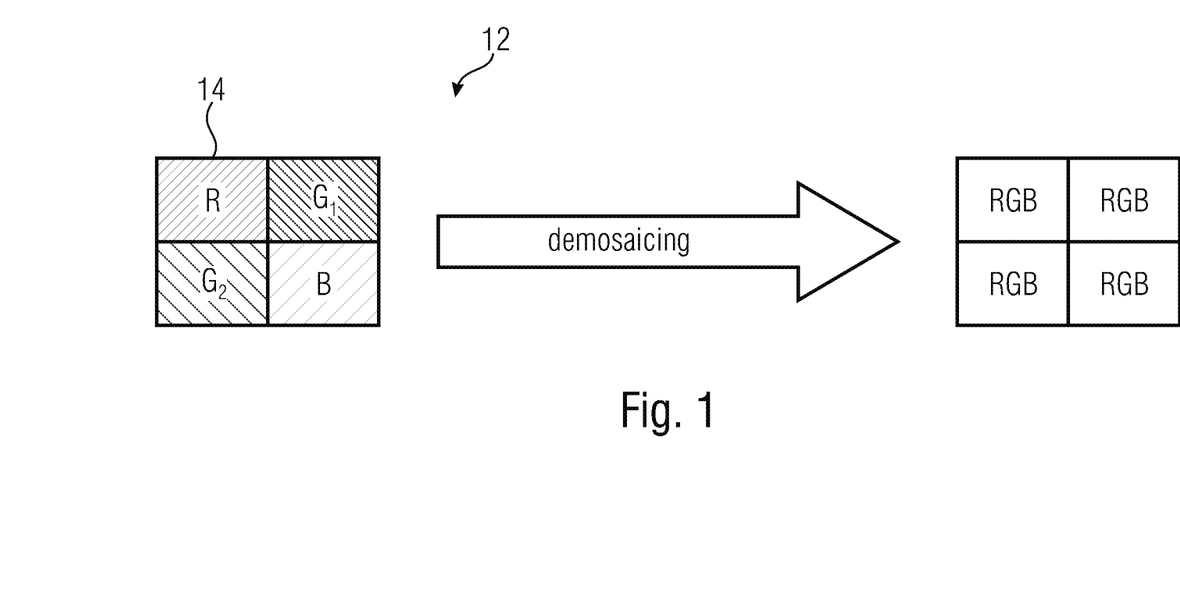
FIG. 1 shows schematically a pixel cell block of an image sensor subjected to a demosaicing step.

Many cameras today are built with only one image sensor chip for image capturing. These sensors are equipped with color filters on top of the photosensitive pixel cells to capture multiple light spectra or color components. FIG. 1 shows schematically a pixel cell block of a commonly used image sensor equipped with a color filter pattern, the so called Bayer pattern. This pattern is a set of (one) red, (two) green and (one) blue color filters (RGB filters) on top of a pixel cell block formed by four pixels, each to create one red, one blue and two green sensitive pixels. The captured values from these pixel cells are the so called raw data. However for displaying a color image at least 3 color values (RGB) for each pixel cell position are required. For this reason the raw data may be processed—this process is called demosaicing—to three color components values (typically RGB or $YC_bC_r$ values) for each pixel cell position. This can be done by linear interpolation.

An effective compression of Bayer raw data is, however, feasible as outlined now.

The first step in compressing an RGB color image is typically a color transformation, as the information in the color components are strongly correlated and this redundancy should be minimized. The result is typically a luminance component and two color difference components YUV or $YC_bC_r$.

To compress Bayer raw data also a color decorrelation should be used. In comparison to standard RGB images however we can use the neighbored four color components R, $G_1$, $G_2$ and B on slightly different positions. The color decorrelation itself should be reversible to recreate the original raw image. If we neglect the slightly different position, we can use the following formula:

$$\begin{bmatrix} C_r \\ C_b \\ Y \\ DY \end{bmatrix} = \begin{bmatrix} m_{11} & m_{12} & m_{13} & m_{14} \\ m_{21} & m_{22} & m_{23} & m_{24} \\ m_{31} & m_{32} & m_{33} & m_{34} \\ m_{41} & m_{42} & m_{43} & m_{44} \end{bmatrix} \cdot \begin{bmatrix} R \\ G_1 \\ G_2 \\ B \end{bmatrix}$$

The decorrelated components are now one Red-Chrominance Cr, one Blue-Chrominance Cb, one Luminance Y and one pseudo Delta-Luminance DY.

The following decorrelation has multiple advantages.

$Cr = R - Y$ $R = C_r + Y$ $C_b = B - Y$ $B = C_b + Y$ $Y = (R + G_1 + G_2 + B)/4$ $G_1 = -1/2 \, C_r - 1/2 \, C_b + Y + 1/2 \, DY$ $DY = G_1 - G_2$ $G_2 = G_1 - DY$ $$\begin{bmatrix} C_r \\ C_b \\ Y \\ DY \end{bmatrix} = \begin{bmatrix} 3/4 & -1/4 & -1/4 & -1/4 \\ -1/4 & -1/4 & -1/4 & 3/4 \\ 1/4 & 1/4 & 1/4 & 1/4 \\ 0 & 1 & -1 & 0 \end{bmatrix} \cdot \begin{bmatrix} R \\ G_1 \\ G_2 \\ B \end{bmatrix} \quad (1)$$

$$\begin{bmatrix} R \\ G_1 \\ G_2 \\ B \end{bmatrix} = \begin{bmatrix} 1 & 0 & 1 & 0 \\ -1/2 & -1/2 & 1 & 1/2 \\ -1/2 & -1/2 & 1 & -1/2 \\ 0 & 1 & 1 & 0 \end{bmatrix} \cdot \begin{bmatrix} C_r \\ C_b \\ Y \\ DY \end{bmatrix} \quad (2)$$

Firstly, it is reversible. That means the four components $C_r$, $C_b$, Y and DY can be transformed back lossless to R, $G_1$, $G_2$, B. Only a lossy compression between forth and back transformation would result in losses.

Secondly, the first three components $C_r$, $C_b$, Y can be used directly to transform them into an RGB image with half width and half height by using G as mean value of $G_1$ and $G_2$. This is equivalent to consider one Bayer pixel cell block as one RGB macro pixel.

$$\begin{bmatrix} R \\ G \\ B \end{bmatrix} = \begin{bmatrix} 1 & 0 & 1 & 0 \\ -1/2 & -1/2 & 1 & 0 \\ 0 & 1 & 1 & 0 \end{bmatrix} \cdot \begin{bmatrix} C_r \\ C_b \\ Y \\ DY \end{bmatrix} \quad (3)$$

with $G = \dfrac{G_1 + G_2}{2}$

Third, the three components $C_r$, $C_b$ and Y can be considered as color image with a residual DY. By using all 4 components the raw image can be reconstructed.

Summarizing, using the above color transform for compression of raw data we are able to achieve high compression efficiency owing to the good decorrelation behavior. Nevertheless, it is easy to use the transformed $C_r$, $C_b$, Y data after transformation as RGB image with half size and half width without greater efforts. The residual DY and the half resolution image together may be used to reconstruct the Bayer raw data to full resolution image.

Figure 2:
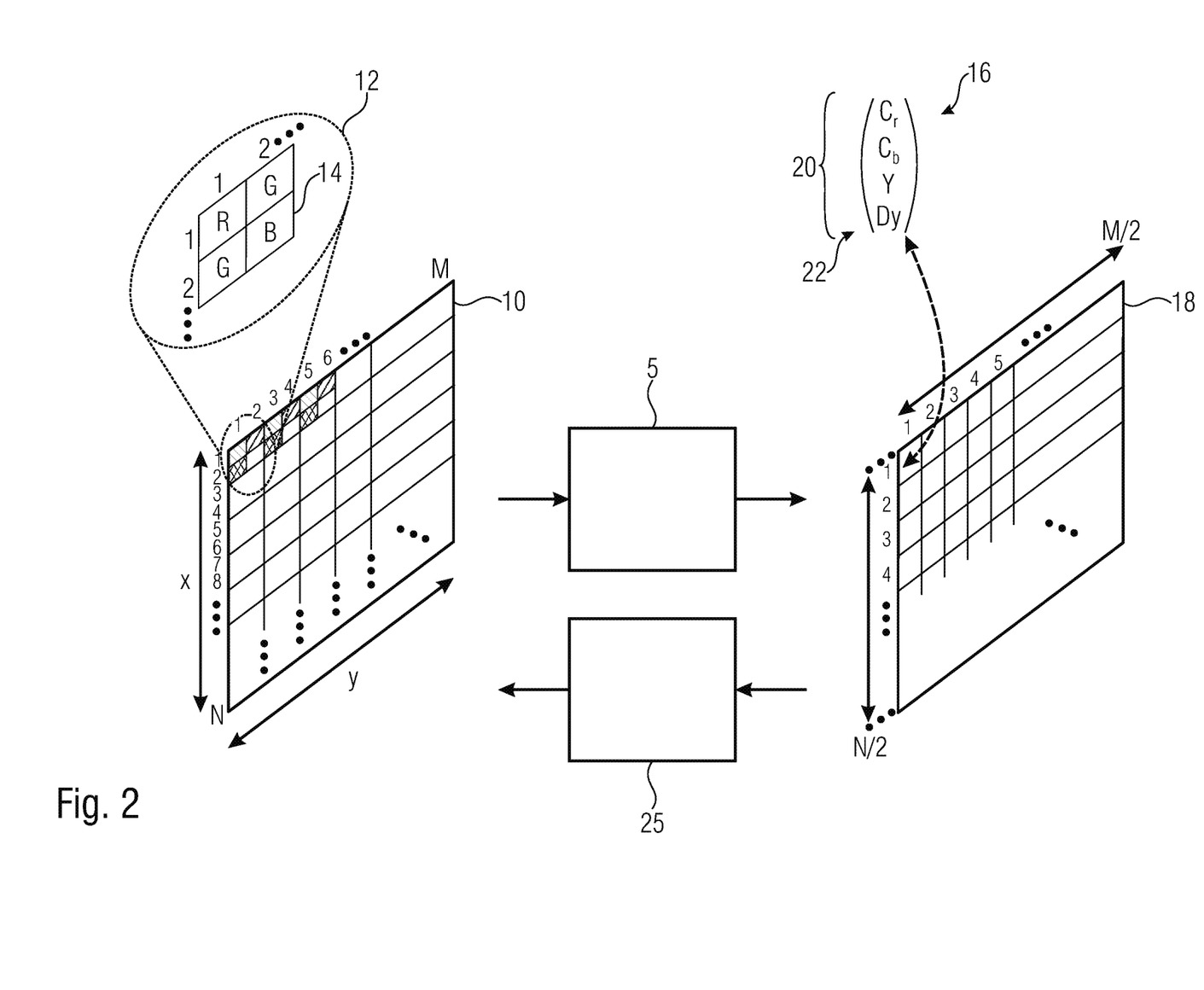
FIG. 2 illustrates schematically a first and a second apparatus configured to perform color transforming a color image, according to a first and a second embodiment of the present invention.

FIG. 2 illustrates schematically a color transformation and its retransformation which underlies embodiments for a raw image encoder and its pendant, the decoder, embodiments of which are further outlined below.

The forward color transform 5 is for color transforming of a raw image 10 into a color image 18. The color image 10 is formed by a number of X lines by Y columns of pixel cell blocks 12, wherein each cell blocks 12 comprises four pixels 14, arranged as a 2×2 sub-block. That is, the raw image 10 has N times M pixels clustered into N/2 times M/2 super-pixels, called pixel cell blocks 12. To compress the raw data in image 10 which might correspond to a Bayer pattern, a color decorrelation is realized by the color transformation 5. In comparison to standard multi-component images such as image 18 and such as RGB images, for example, the neighbored four color components R, $G_1$, $G_2$ and B in a pixel cell block 12 of raw image 10 reside on slightly different positions.

The color transform 5 is designed to deal with a raw image 10 of such a color pattern. As said, the raw image 10 is partitioned into pixel cell blocks 12, each pixel cell block 12 comprising four pixels 14, each pixel 14 being associated with one of three base colors so that each pixel cell block 12 comprises, for each of the three base colors, at least one pixel. For each pixel cell block 12, the four pixels 14 of the pixel cell block 12 are mapped onto a color component quadruple 16 forming a sample of the color image 18.

The mapping 5 may be done according to (1): each pixel cell block 12 of a Bayer pattern raw image 10 which comprises four pixels R red, $G_1$ green, $G_2$ green, and B blue, is mapped onto a color component quadruple $\{C_r, C_b, Y, DY\}$ 16 according to (1), with the quadruple forms a sample of the color image 18.

The color component quadruple 16 comprises three color component values 20 of a target color spaces and one pseudo color component value 22. The decorrelated components color component quadruple 16 may be referred as e.g. color component values 20 being one Red-Chrominance $C_r$, one Blue-Chrominance $C_b$, one Luminance Y as well as the pseudo color component value 22 as a pseudo Delta-Luminance DY. That is, the afore-mentioned target color space may be elected to be a $YC_r C_b$ color space. The first three component values (20) $C_r$, $C_b$, Y can be used e.g. to be directly transformed into an RGB image with half width and half height. This is equivalent to consider one pixel cell block 12 as one RGB macro pixel. However, alternatives using other color spaces are feasible as well The four color components Cr, Cb, Y and DY may be transformed back lossless to the color components R, $G_1$, $G_2$ and B. This is done by the color retransformation 25. Function (1) and (2) may, thus, be based on a linear mapping. In transform 5 each of the three color component values 20 may result from a weighted sum of the four pixels 14 of the pixel cell block 12. The weights of the weighted sum of the two pixels of the pixel cell block may be associated accordingly with the same base color are equal to each other. See, for instance, the middle columns in the first three lines of the matrix of (1). Further, the linear mapping 5 may be such that the one pseudo color component value 22 results from a further weighted sum of the two pixels of the pixel cell block associated with the same base color, wherein only the weights of the weighted sum of the two pixels being of opposite sign. See the lower row in (1), for instance.

FIG. 2 illustrates schematically also the color retransforming procedure 25 from color image 18 to raw image 10. The transform 25 maps, for each sample of the color image 18, the color component quadruple 16 representing this sample, onto the four pixels 14 of the corresponding pixel cell block 12. That is, image 18 comprises as many samples as raw image 10 has pixel cell blocks 12. The color component quadruple 16 comprises three color component values 20 of a predetermined color space and a pseudo color component value 22.

In the example set out below, the retransform 25 maps each color component quadruple $\{C_r, C_b, Y, DY\}$ 16 according to (2) onto pixels R red, $G_1$ green, $G_2$ green, and B blue of a corresponding pixel cell block 12 of the Bayer pattern raw image 10. Again, other examples would be feasible as well. In particular, the mapping may be a linear mapping where the two pixels of the pixel cell block 12 being associated with the same base color respectively, i.e. $G_1$ and $G_2$, result from a weighted sum of the color component quadruple 16 with weights of the weighted sum for the two pixels being equal. See the first three columns in the middle two lines of the matrix in (2), for instance. The weights of the weighted sum of the one pseudo color component value may be of opposite sign. See the rightmost column in the middle two lines of the matrix in (2), for instance. The predetermined color space may be selected to be a $YC_r C_b$ color space or differently.

Figure 3:
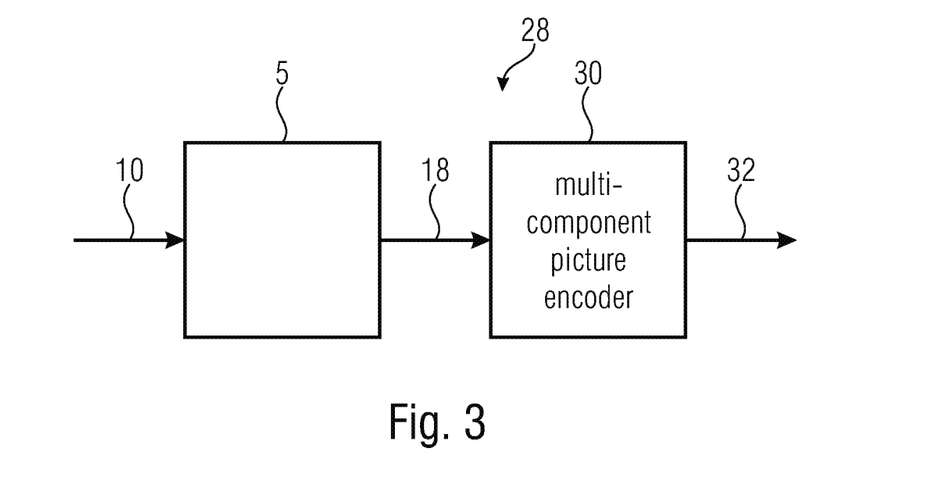
FIG. 3 illustrates schematically a raw image encoder, according to a specific embodiment of the present invention.

FIG. 3 illustrates schematically an encoding device 28 comprising the raw image encoder 5 and a multi-component picture encoder 30 configured to encode a color image 18 output by the apparatus into a compressed multi-component data stream 32. The multi-component picture encoding performed may comprise lossy coding, spatial transform coding, entropy coding, spatial predictive coding, residual transform coding, and/or motion compensation predictive coding.

Figure 4:
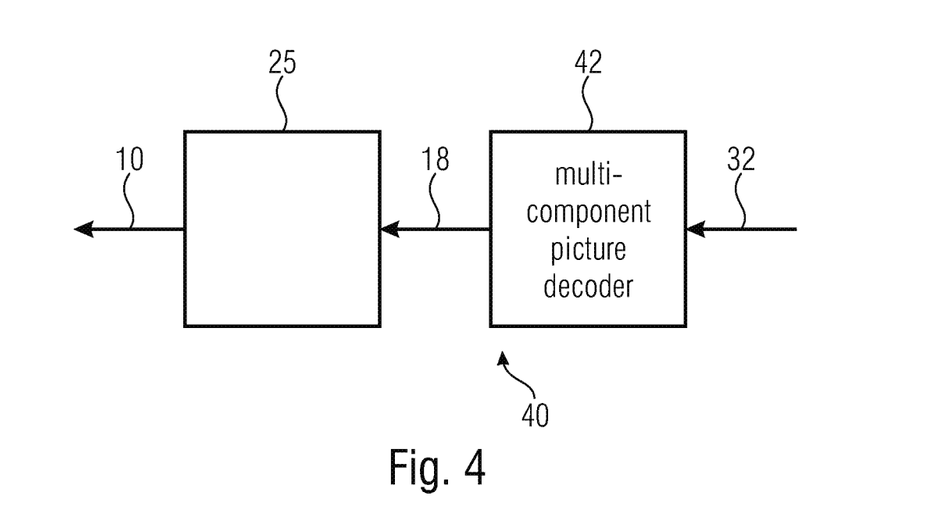
FIG. 4 illustrates schematically a decoder, according to a specific embodiment of the present invention.

FIG. 4 illustrates schematically a raw image decoding device 40 configured for reconstructing a raw image 10 from a multi-component data stream 32 comprising a decoder 25 and a multi-component picture decoder 42 configured to decode a color image 18 from the multi-component data stream 32. The multi-component picture decoding may comprise spatial transform decoding, entropy decoding, spatial predictive decoding, residual transform decoding, and/or motion compensation predictive decoding.

The invention claimed is:

1. Raw image encoder for encoding a Bayer pattern raw image, configured to map each pixel cell block of the Bayer pattern raw image which comprises four pixels R (red), $G_1$ (green), $G_2$ (green), and B (blue), onto a color component quadruple $\{Cr, Cb, Y, DY\}$ according to $$\begin{bmatrix} C_r \\ C_b \\ Y \\ DY \end{bmatrix} = \begin{bmatrix} 3/4 & -1/4 & -1/4 & -1/4 \\ -1/4 & -1/4 & -1/4 & 3/4 \\ 1/4 & 1/4 & 1/4 & 1/4 \\ 0 & 1 & -1 & 0 \end{bmatrix} \cdot \begin{bmatrix} R \\ G_1 \\ G_2 \\ B \end{bmatrix} \text{ or } \begin{bmatrix} C_r \\ C_b \\ Y \\ DY \end{bmatrix} =$$

$$a \cdot \begin{bmatrix} 3/4 & -1/4 & -1/4 & -1/4 \\ -1/4 & -1/4 & -1/4 & 3/4 \\ 1/4 & 1/4 & 1/4 & 1/4 \\ 0 & 1 & -1 & 0 \end{bmatrix} \cdot \begin{bmatrix} R \\ G_1 \\ G_2 \\ B \end{bmatrix}$$

with a being a constant, which forms a sample of the color image, and subject the color image to a multi-component picture encoding to obtain a compressed data stream.

2. Raw image encoder according to claim 1, wherein the multi-component picture encoding comprises lossy coding, spatial transform coding, entropy coding, spatial predictive coding, residual transform coding, and/or motion compensation predictive coding.

3. Decoder for reconstructing from a compressed data stream a Bayer pattern raw image, configured to
decode from a compressed data stream by multi-component picture decoding a color image, samples of which are respectively formed by a color component quadruple, and
map each color component quadruple {Cr, Cb, Y, DY} according to $$\begin{bmatrix} R \\ G_1 \\ G_2 \\ B \end{bmatrix} = \begin{bmatrix} 1 & 0 & 1 & 0 \\ -1/2 & -1/2 & 1 & 1/2 \\ -1/2 & -1/2 & 1 & -1/2 \\ 0 & 1 & 1 & 0 \end{bmatrix} \cdot \begin{bmatrix} C_r \\ C_b \\ Y \\ DY \end{bmatrix} \text{ or } \begin{bmatrix} R \\ G_1 \\ G_2 \\ B \end{bmatrix} =$$

$$b \cdot \begin{bmatrix} 1 & 0 & 1 & 0 \\ -1/2 & -1/2 & 1 & 1/2 \\ -1/2 & -1/2 & 1 & -1/2 \\ 0 & 1 & 1 & 0 \end{bmatrix} \cdot \begin{bmatrix} C_r \\ C_b \\ Y \\ DY \end{bmatrix}$$

with b being a constant,
onto pixels R (red), $G_1$ (green), $G_2$ (green), and B (blue) of a pixel cell block of the Bayer pattern raw image.

4. Decoder according to claim 3, the multi-component picture decoding comprises spatial transform decoding, entropy decoding, spatial predictive decoding, residual transform decoding, and/or motion compensation predictive decoding.

5. Decoder according to claim 3, configured to, in a coding mode option, reconstruct from the compressed data stream an RGB image, by
decoding from the compressed data stream by multi-component picture decoding the color image, samples of which are respectively formed by a color component quadruple, and
mapping each color component quadruple {Cr, Cb, Y, DY} according to $$\begin{bmatrix} R \\ G \\ B \end{bmatrix} = \begin{bmatrix} 1 & 0 & 1 & 0 \\ -1/2 & -1/2 & 1 & 0 \\ 0 & 1 & 1 & 0 \end{bmatrix} \cdot \begin{bmatrix} C_r \\ C_b \\ Y \\ DY \end{bmatrix} \text{ or } \begin{bmatrix} R \\ G \\ B \end{bmatrix} =$$

$$b \cdot \begin{bmatrix} 1 & 0 & 1 & 0 \\ -1/2 & -1/2 & 1 & 0 \\ 0 & 1 & 1 & 0 \end{bmatrix} \cdot \begin{bmatrix} C_r \\ C_b \\ Y \\ DY \end{bmatrix}$$

with b being a constant
onto R (red), G (green) and B (blue) components of a sample an RGB image.

6. Decoder for reconstructing from a compressed data stream an RGB image, configured to
decode from a compressed data stream by multi-component picture decoding a color image, samples of which are respectively formed by a color component quadruple, and
map each color component quadruple {Cr, Cb, Y, DY} according to $$\begin{bmatrix} R \\ G \\ B \end{bmatrix} = \begin{bmatrix} 1 & 0 & 1 & 0 \\ -1/2 & -1/2 & 1 & 0 \\ 0 & 1 & 1 & 0 \end{bmatrix} \cdot \begin{bmatrix} C_r \\ C_b \\ Y \\ DY \end{bmatrix} \text{ or } \begin{bmatrix} R \\ G \\ B \end{bmatrix} =$$

$$b \cdot \begin{bmatrix} 1 & 0 & 1 & 0 \\ -1/2 & -1/2 & 1 & 0 \\ 0 & 1 & 1 & 0 \end{bmatrix} \cdot \begin{bmatrix} C_r \\ C_b \\ Y \\ DY \end{bmatrix}$$

with b being a constant
onto R (red), G (green) and B (blue) components of a sample an RGB image.

7. Method for encoding a Bayer pattern raw image, comprising
mapping each pixel cell block of the Bayer pattern raw image which comprises four pixels R (red), $G_1$ (green), $G_2$ (green), and B (blue), onto a color component quadruple {Cr, Cb, Y, DY} according to $$\begin{bmatrix} C_r \\ C_b \\ Y \\ DY \end{bmatrix} = \begin{bmatrix} 3/4 & -1/4 & -1/4 & -1/4 \\ -1/4 & -1/4 & -1/4 & 3/4 \\ 1/4 & 1/4 & 1/4 & 1/4 \\ 0 & 1 & -1 & 0 \end{bmatrix} \cdot \begin{bmatrix} R \\ G_1 \\ G_2 \\ B \end{bmatrix} \text{ or } \begin{bmatrix} C_r \\ C_b \\ Y \\ DY \end{bmatrix} =$$

$$a \cdot \begin{bmatrix} 3/4 & -1/4 & -1/4 & -1/4 \\ -1/4 & -1/4 & -1/4 & 3/4 \\ 1/4 & 1/4 & 1/4 & 1/4 \\ 0 & 1 & -1 & 0 \end{bmatrix} \cdot \begin{bmatrix} R \\ G_1 \\ G_2 \\ B \end{bmatrix}$$

with a being a constant
which forms a sample of the color image, and
subjecting the color image to a multi-component picture encoding to obtain a compressed data stream.

8. Method for reconstructing from a compressed data stream a Bayer pattern raw image, comprising
decoding from a compressed data stream by multi-component picture decoding a color image, samples of which are respectively formed by a color component quadruple, and
mapping each color component quadruple {Cr, Cb, Y, DY} according to $$\begin{bmatrix} R \\ G_1 \\ G_2 \\ B \end{bmatrix} = \begin{bmatrix} 1 & 0 & 1 & 0 \\ -1/2 & -1/2 & 1 & 1/2 \\ -1/2 & -1/2 & 1 & -1/2 \\ 0 & 1 & 1 & 0 \end{bmatrix} \cdot \begin{bmatrix} C_r \\ C_b \\ Y \\ DY \end{bmatrix} \text{ or } \begin{bmatrix} R \\ G_1 \\ G_2 \\ B \end{bmatrix} =$$

$$b \cdot \begin{bmatrix} 1 & 0 & 1 & 0 \\ -1/2 & -1/2 & 1 & 1/2 \\ -1/2 & -1/2 & 1 & -1/2 \\ 0 & 1 & 1 & 0 \end{bmatrix} \cdot \begin{bmatrix} C_r \\ C_b \\ Y \\ DY \end{bmatrix}$$

with b being a constant,
onto pixels R (red), $G_1$ (green), $G_2$ (green), and B (blue) of a pixel cell block of the Bayer pattern raw image.

9. A non-transitory digital storage medium having a computer program stored thereon to perform the method for reconstructing from a compressed data stream a Bayer pattern raw image, comprising decoding from a compressed data stream by multi-component picture decoding a color image, samples of which are respectively formed by a color component quadruple, and mapping each color component quadruple {Cr, Cb, Y, DY} according to $$\begin{bmatrix} R \\ G_1 \\ G_2 \\ B \end{bmatrix} = \begin{bmatrix} 1 & 0 & 1 & 0 \\ -1/2 & -1/2 & 1 & 1/2 \\ -1/2 & -1/2 & 1 & -1/2 \\ 0 & 1 & 1 & 0 \end{bmatrix} \cdot \begin{bmatrix} C_r \\ C_b \\ Y \\ DY \end{bmatrix} \text{ or } \begin{bmatrix} R \\ G_1 \\ G_2 \\ B \end{bmatrix} = b \cdot \begin{bmatrix} 1 & 0 & 1 & 0 \\ -1/2 & -1/2 & 1 & 1/2 \\ -1/2 & -1/2 & 1 & -1/2 \\ 0 & 1 & 1 & 0 \end{bmatrix} \cdot \begin{bmatrix} C_r \\ C_b \\ Y \\ DY \end{bmatrix}$$

with b being a constant, onto pixels R (red), $G_1$ (green), $G_2$ (green), and B (blue) of a pixel cell block of the Bayer pattern raw image, when said computer program is run by a computer.

* * * * *